United States Patent Office 3,234,161
Patented Feb. 8, 1966

3,234,161
PREPARATION OF STABLE POLYVINYL
ACETAL DISPERSIONS
James A. Snelgrove, West Springfield, and Wells Whitney,
North Wilbraham, Mass., assignors, by mesne assignments, to Monsanto Company, a corporation of Delaware
No Drawing. Filed July 25, 1960, Ser. No. 44,901
4 Claims. (Cl. 260—29.6)

This invention relates to stable aqueous dispersions of polyvinyl acetal resins and the process for preparing the same. More particularly, this invention relates to the preparation of such dispersions containing relatively minor amounts of or no plasticizer for poylvinyl acetal resin, which dispersions yielding films having greatly improved properties compared to the properties of films obtained from aqueous dispersions of a polyvinyl acetal resin containing comparatively larger concentrations of plasticizer.

It is known to prepare stable aqueous polyvinyl butyral dispersions containing a plasticizer for the polyvinyl butyral resin in the proportions 5–80 parts plasticizer per 100 parts polyvinyl butyral resin. The method of preparation of these dispersions is taught in U.S.P. 2,532,223 and 2,611,755. The dispersions have received great commercial acceptance for the preparation of films wherein it is desired to obtain films having excellent strength, water resistance, toughness and abrasion resistance. The above mentioned patents also teach the preparation of the stable aqueous polyvinyl butyral dispersion in light-weight equipment utilizing relatively low power consumption rates of approximately 1 horsepower per gallon of the dispersion containing 20–40 parts plasticizer per 100 parts polyvinyl butyral in the dispersion.

It has been desirable to prepare stable aqueous dispersions of a polyvinyl acetal resin containing less plasticizer in order to obtain films therefrom possessing even greater strength and abrasion resistance, less elongation at break, and even lower tack. It has been desirable to find a means for the preparation of these lower plasticizers containing dispersions in the same light-duty equipment heretofore used for the preparation of the known dispersions.

It is the object of the present invention to provide improved stable dispersions of a polyvinyl acetal containing 0–5 parts plasticizer per 100 parts polyvinyl acetal resin dispersion.

It is another object of the invention to provide a process for the preparation of these dispersions which will permit the use of light-duty equipment for the preparation of the dispersion.

It is still another object of the invention to provide improved stable dispersions of a polyvinyl acetal resin containing 0–5 parts plasticizer per 100 parts polyvinyl acetal resin which, if desired, may be further plasticized, thereby allowing the user thereof complete freedom in the choice of type and amount of plasticizer finally used.

The applicants have found that certain constituents properly selected and brought together in critical amounts and in a particular manner can be made to form a stable dispersion of a polyvinyl acetal resin containing 0–5 parts plasticizer per 100 parts polyvinyl acetal resin and having the improved properties described. It was not expected that these compositions could be prepared since they cannot be prepared by following the methods described in the above mentioned patents. It was also not expected that the present dispersions could be made in light-duty equipment with power consumption rates of approximately 1 horsepower per gallon of dispersion by reason of the lower plasticizer content in the dispersion.

More specifically, less plasticizer based on the weight of the resin in the dispersion increases the viscosity of the dispersion being formed, hence should increase power consumption, as is taught in U.S.P. 2,455,402.

The applicants have found surprisingly that stable aqueous dispersions containing 0.5 parts plasticizer per 100 parts polyvinyl acetal can be prepared in light-duty equipment with power consumption rates of approximately 1 horsepower per gallon of dispersion by agitating a mixture comprising 100 parts of a polyvinyl acetal containing not more than 30% hydroxyl groups calculated as polyvinyl alcohol, not over 30% ester groups calculated as polyvinyl ester and the balance substantially acetal groups, up to 5 parts of a plasticizer for the polyvinyl acetal, 0.5–30 parts of an emulsifier and with sufficient water to form a water-in-resin dispersion while heating the mixture to at least the second order transition of the resinous phase, agitating and heating said mixture to form a water-in-resin dispersion and then with continued agitation and maintenance of the temperature of the mixture at least at the second order transition temperature of the resinous phase adding sufficient water to cause the water-in-resin dispersion to invert to a resin-in-water dispersion.

More specifically, the applicants have found that a critical temperature range exists in which the present polyvinyl acetal dispersions can be prepared with low power consumption rates in light-duty equipment: The minimum temperature in the range is at least equal to the second order transition temperature for the particular resinous phase in the dispersion, the resinous phase comprising the combination of the polyvinyl acetal resin and the plasticizer, if one is used. Although the variation of second order transition temperature with the identity of the resin as well as with the resin molecular weight and the effect of plasticizer thereon is a generally understood concept and therefore need not be further explained, that stable aqueous polyvinyl acetal dispersion can be prepared by the process described is not to be expected therefrom. The reason for this, as will be illustrated in the succeeding examples is that not only is it necessary to elevate the temperature of the aqueous mixture from which the dispersion is formed above the second order transition temperature of the resinous phase of the mixture but it is also necessary to maintain this temperature during the inversion of the water-in-resin dispersion to a resin-in-water dispersion in order to obtain a final stable product. The maximum temperature in the critical range for the preparation of stable aqueous dispersions is governed by other factors hereinafter to be explained.

The meaning of the term "second order transition temperature of the resinous phase" as appearing in the specification and claims can best be defined as the temperature at which a test specimen of the solid polyvinyl acetal has a modulus of elasticity value of $1 \times 10^4$ p.s.i. It should be noted that if the dispersion is to contain a plasticizer in the amounts disclosed for the compositions of the invention, that the test specimen also contains the corresponding amount of plasticizer based on the weight of the resin. The determination of the "second order transition temperature of the resinous phase" is made on the test specimen according to ASTM Specification D–1043–497. Second order transition temperatures for polyvinyl butyral containing 0–5 parts dibutyl phthalate per 100 parts polyvinyl butyral were found to be 54–64° C. As stated previously, the specific value of the second transition temperature will vary widely not only between different types of polyvinyl acetal resins, but also between different molecular weights of a given type resin. The effect of this, is to prevent the prediction of an absolute minimum temperature to which the aqueous resin mixture must be heated according to the process of the invention in order to form a stable dispersion except in terms of said second order transition temperature of the resinous phase. It can be noted, however, that where it is desired to prepare a particular dispersion from a given resin and a specific amount of plasticizer, the second order transition temperature can be determined as described, without undue experimentation, hence defining the minimum temperature to be employed in the process of the invention.

The invention may be practiced in its preferred embodiment as shown in the following examples and subsequent discussions thereon, but it is not limited thereto. Where parts and percentages are employed hereinafter in the specification and claims, they are parts and percentages by weight unless otherwise specified.

*Example 1*

A plasticized aqueous polyvinyl butyral dispersion was prepared having the following composition:

| | Parts |
|---|---|
| Polyvinyl butyral (2.5% acetate content, 17.5 hydroxyl content, remainder butyral content and weight average molecular weight of approximately 225,000) | 100 |
| Potassium hydroxide | 1 |
| Oleic acid | 6 |
| Butyl ricinoleate | 4.5 |
| Water | 111.5 |

The polyvinyl butyral resin and potassium hydroxide were charged to a standard Baker-Perkins sigma blade jacket-head mixer along with 12.8 parts of water and heated to 75–80° C. in about 15–20 minutes by running low-pressure steam to the jack. Thereupon the oleic acid and butyl ricinoleate ingredients were added to the batch, mixed and heated until the temperature reached 75–80° C. A curved restraining head was then brought down to exert a pressure of about 6 p.s.i. on the batch and the steam turned off. Due to the intensive shear and working in the mixer, the batch temperature increased slowly. When a temperature range of 90–95° C. was reached, the resin mixture fused and a water-in-resin dispersion was formed. Cooling water was then run through the mixer jacket and the mixing continued so as to improve the dispersion of the internal phase. This state of the process required the highest power input which fluctuated between 0.8–1.2 horsepower per gallon of working capacity. Next, approximately 13 parts of the water above shown was added slowly to the batch, whereupon the batch inverted to a resin-in-water dispersion of very small particle size. At the inversion point the power input dropped sharply. The restraining head was then raised, and the rest of the water above shown added slowly to give a milk-white dispersion of 50% solids by weight, having a pH of 9 and a viscosity of 50 centipoises when measured with a Brookfield viscosimeter using a number 1 spindle at 30 r.p.m.

The above dispersion was cast at a 15 mil wet thickness on a smooth hard surface and dried at 50° C. in a gravity convection oven to yield a clear, continuous, strippable, non-redispersible, non-tacky film with high abrasion resistance, a tensile strength of 6000 p.s.i. and the relatively low elongation of 150% at break.

*Example 2*

A non-plasticized polyvinyl butyral dispersion was prepared having the following composition:

| | Parts |
|---|---|
| Polyvinyl butyral (2% acetate content, 18% hydroxyl content, remainder butyral content, and weight average molecular weight of approximately 32,000) | 100 |
| Potassium hydroxide | 1 |
| Oleic acid | 6 |
| Water | 161 |

The polyvinyl butyral and potassium hydroxide were charged to the mixer with 12.2 parts of water and heated to 55–60° C. in about 10–15 minutes. The oleic acid was then added and mixed until the temperature again reached 55–60° C. The steam was then turned off and the restraining head brought down with a pressure of about 2.5 p.s.i. on the batch. In about ten minutes, the resin mixture fused and a water-in-resin dispersion was formed. The cooling water was regulated during this stage to maintain a temperature range in between 70–85° C. The power input ranged from 0.7–1.1 horsepower per gallon of capacity. Next, about 25 parts of water were added to the batch slowly whereupon the batch inverted to a resin-in-water dispersion. The batch temperature was 71° C. at this point. The restraining head was then raised and the rest of the water above listed was added to give a milk-white dispersion of 40% solids by weight, having a pH of 8.8 and a viscosity of 400 centipoises when measured with a Brookfield viscosimeter, using a number 2 spindle at 30 r.p.m.

This dispersion was cast as a 15 mil wet film on a smooth, hard surface and dried at 50° C. in a gravity convection oven, to yield a clear, continuous, strippable, non-tacky, non-redispersible film with high abrasion resistance having a tensile strength of 5000 p.s.i. and a relatively low elongation of 75% at break.

*Example 3*

To illustrate further compositions within the contemplation of the invention, a non-plasticized polyvinyl butyral dispersion was prepared having the following composition:

| | Parts |
|---|---|
| Polyvinyl butyral of Example 1 | 95 |
| Polyvinyl butyral of Example 2 | 5 |
| Potassium hydroxide | 1 |
| Oleic acid | 6 |
| Water | 107 |

The polyvinyl butyral was charged to the mixer with 15 parts of the water above listed and the batch heated at 80° C. whereupon the oleic acid was added, the restraining head adjusted to 6 p.s.i. on the batch and the heating continued until the batch reached 90° C. Due to the high temperatures reached, water loss by evaporation was severe. The batch thereafter would not fuse into a water-in-resin dispersion at 90° C. until enough replacement water had been added to make a total of 7.5 parts water on the original charge. When the batch did fuse, the cooling water was regulated to maintain a temperature range of 85–90° C. Next, 12 parts of water from the above listed amount where added slowly whereupon the batch inverted with a temperature at inversion of 88° C. The restraining head was then raised and the rest of the water from the above listed amount added slowly to give a 50% solids dispersion.

A clear, continuous film was formed from this dispersion by drawing a 15 mil wet film on a smooth hard surface and dried in a gravity convection oven at 50° C., which film had a tensile strength of 7000 p.s.i. and an elongation at break of 75%.

*Example 4*

A non-plasticized polyvinyl butyral dispersion was prepared having the following composition:

| | Parts |
|---|---|
| Polyvinyl butyral of Example 1 | 100 |
| Potassium hydroxide | 1 |
| Oleic acid | 6 |
| Water | 107 |

The polyvinyl butyral, potassium hydroxide and 14.5 parts water from the above listed amount were charged to the mixer, heated to 80° C. and thereafter the oleic acid added. The heating was continued with the restraining head lowered until the batch temperature reached 95° C. As in preceding Example 3, since much of the original water was lost during the heating period due to evaporation, additional water had to be added at this stage. When a total of 8 to 9 parts water had been added, the batch formed a rather fluid, coarse dispersion of resin-in-water. The batch was then dried slowly until only 7 parts water remained in the batch, at which point, still at 95° C., the resin mixture fused to form a water-in-resin dispersion. Next 11.4 parts water from the above listed amount was slowly added while the batch temperature was maintained at 85–90° C., whereupon the batch inverted to a resin-in-water dispersion of very fine particle size. The restraining head was then raised and the remainder of the water from the above listed amount then added slowly to give a 50% solids dispersion with a pH of 9 and a viscosity of 95 centipoises, which viscosity was measured with a Brookfield viscosimeter using a number 2 spindle at 30 r.p.m.

This dispersion was cast as a 15 mil wet film on a smooth hard surface and dried at 75–85° in a gravity convection oven to form a clear continuous film having a tensile strength of approximately 7000 p.s.i. and an elongation at break of less than 50%.

To further illustrate the range of conditions necessary to produce the stable aqueous dispersion of the invention, Examples 5–6 are shown for comparison purposes, wherein conditions outside the scope of the invention were employed. Example 5 illustrates the necessity of elevating the temperature of the aqueous mixture from which the dispersion is formed above the second-order transition temperature of the resinous phase. Example 6 illustrates the necessity for maintaining the batch temperature above said second order transition temperature during the period from fusion of the batch through inversion to the final resin-in-water dispersion.

*Example 5*

The same charge was used in this Example as in Example 1. The polyvinyl butyral resin, potassium hydroxide and water were charged to the mixer and heated to 75° C. Then the oleic acid and butyl ricinoleate were added. The steam was turned off and the restraining head thereafter lowered onto the batch. The batch cooled to 67° C. upon the addition of the oleic acid and butyl ricinoleate plasticizer. At this temperature the resin grain was not soft enough to start fusing together, thus very little internal heat build-up was encountered. After 30 minutes, the batch compressed in volume and the restraining head could not exert enough pressure on the batch to aid the fusion. Subsequent heating did not help to fuse the batch. No dispersion resulted.

*Example 6*

The same charge was used in this Example as in Example 2. The polyvinyl butyral resin, potassium hydroxide and water were charged into the mixer and were heated to 55° C., then the oleic acid was added and the batch re-heated to 55° C. The heating was thereupon turned off and the restraining head lowered. When the batch fused together, the cooling water was turned on and additional water was added slowly to the batch. When 30 parts water had been added, the batch temperature was approximately 40° C. and the batch observed to be very soft and spongy. The power input dropped but not as far as in Example 2 at inversion. When the restraining head was raised, the batch puffed up out of the mixer and further water dilution was very difficult. No dispersion resulted.

As has been shown in the preceding examples, the temperature to which the batch will be heated to form the dispersions of the invention will also depend upon the equipment selected for the preparation. For example, it will be obvious that temperatures above the boiling point of the water may not be employed in the unpressurized equipment described in the examples. For this equipment, it has been found that temperatures in the range 70–100° C. can be selected, dependent upon the second-order transition temperature of the resinous phase of the batch. It is preferred not to exceed 95° C. with this equipment in order to minimize excess volatilization of the water component in the initial charge and the consequent necessity of thereafter adding make-up water in order to insure the formation of a sufficiently low viscosity water-in-resin dispersion during the process at low power requirements. The optimum temperature selected for the heating cycle to maintain low power requirements will also depend upon such other considerations as solids content, amount and type of emulsifier and plasticizer etc.

Other variations can be introduced in the process of the invention as described in the above examples. For example, although the dispersion prepared in said preceding examples all vary between 40–50% solids by weight, stable dispersions can be made according to the invention by further diluting the dispersions to less than 1% solids without settling of the individual discrete resin particles. Higher solids dispersions can also be prepared by the practice of the invention. It is obviously also possible to vary the periods of heating employed during the process from that shown in the examples without detrimental effect upon the properties of the final dispersion. Still further, it is within the contemplation of the invention to employ other light-duty equipment than the specific type above described and still achieve stable dispersions by means of the present process.

The novel products of the invention are stable aqueous polyvinyl acetal dispersions of a mixture comprising 100 parts of a polyvinyl acetal containing not more than 30% hydroxyl groups calculated as polyvinyl alcohol, not over 30% ester groups calculated as polyvinyl ester and the balance substantially acetal groups, up to 4.5 parts of a plasticizer for the polyvinyl acetal, and 0.5–30 parts of an emulsifier, from which films may be obtained having improved strength, water-resistance, toughness and abrasion resistance. The novel dispersions may be further characterized as having viscosities at 50% solids ranging from approximately 50 to over 3000 centipoises at 25° C. Aqueous dispersions having a solids concentration in the range 40–60% are especially preferred by reason of possessing greater versatility in the preparation of films for most purposes, including coating, textile finishing, etc.

As a substitute for the butyl ricinoleate plasticizer used in the preceding examples, other plasticizers may be used which are well known to those skilled in the art, e.g., castor oil, dibutoxy ethyl phthalate, diethyl phthalate, dibutyl-sebacate, dibutyl-phthalate, triethylene glycol dihexoate, trioctyl phosphate, triethyl glycol ester of coconut oil fatty acids, phenyl ethers of polyethylene oxide rosin derivatives, oil modified sebacic alkyd resins, etc. Mixtures of these and/or other plasticizers may also be employed.

In place of the soap type emulsifier shown in the preceding examples, e.g., sodium oleate, potassium oleate, which emulsifiers were formed by the reaction of oleic acid with the particular alkali hydroxide added to the batch, other emulsifiers may be employed. For example, other emulsifying agents made from strong bases and soap-forming organic acids which may be used include for example, salts of such bases as the alkali metals, e.g., sodium, potassium, lithium, cesium and rubidium; quaternary ammonium bases, e.g., triphenylmethyl ammonium hydroxide, tetraethyl ammonium hydroxide, etc.; triethanolamine, morpholine, etc., reacted with such organic acids as stearic acid, oleic acid, ricinoleic acid, palmitic acid, lauric acid, dodecyl benzene sulfonic acid, abietic acid, etc. According to the preferred embodiment, the said acid portion of the emulsifier is an organic acid having an aliphatic chain of at least 10 carbon atoms, e.g., 10–20 carbon atoms, such as those given above.

Other suitable emulsifiers can be selected from the general class of water-dispersible surfactants which are compatible with a polyvinyl acetal resin and typical examples of which are aryl alkyl sulfonates, tertiary amines and polyethylene oxide fatty acid condensates.

Suitable polyvinyl acetals for the practice of the invention are obtained by reacting polyvinyl alcohol or a partially hydrolyzed polyvinyl ester with an aldehyde, especially butyraldehyde. The suitable polyvinyl acetals may be characterized as containing not more than 30% hydroxyl groups calculated as polyvinyl alcohol, not over 30% ester groups calculated as polyvinyl ester and the balance substantially acetal groups. The preparation of suitable polyvinyl acetal resins is well known, such as taught in Re. 20,430. Other polyvinyl acetals such as the reaction products of hydrolyzed polyvinyl esters with formaldehyde, acetaldehyde, propionaldehyde and benzaldehyde, also may be used in the practice of this invention.

The polyvinyl alcohols or partially hydrolyzed polyvinyl esters from which the polyvinyl acetals are made may have widely varying degrees of polymerization as evidenced by the viscosities of solutions thereof. For example, polyvinyl acetates may be used which in one molar benzene solution have viscosities of 1.5–500 or more centipoises at 20° C. The ester groups in the preferred polyvinyl butyrals are usually acetate groups but the acetate groups may be wholly or partially replaced by other ester groups such as formate, propionate, butyrate, benzoate, etc. Especially preferred embodiments of the polyvinyl butyrals contain more than 5% and usually more than 10% hydroxyl groups by weight, but no more than 25% hydroxyl groups calculated as polyvinyl alcohol. Molecular weights of the preferred polyvinyl butyral resins in excess of 40,000 yield films having especially good mechanical properties.

It will be obvious that various fillers and modifying agents may be added to the present dispersions without departing from the spirit and scope of the invention. For example, starches, clays, natural gums and synthetic thickeners are commonly used to aid in the application of or to vary the characteristics of the product. Additionally, as hereinbefore stated, additional plasticizer may be added to the present dispersions where desired. When it is desired to increase the amount of plasticizer in the present dispersions, this may readily be done by forming an aqueous dispersion of a compatible plasticizer to be added and then incorporating the dispersion in the polyvinyl acetal dispersion.

What is claimed is:

1. A process for the prepartion of a stable aqueous non-plasticized polyvinyl acetal dispersion which comprises agitating a mixture free of plasticizer, comprising:
   (a) 100 parts of a polyvinyl acetal containing not more than 30% hydroxyl groups calculated as polyvinyl alcohol, not over 30% ester groups calculated as polyvinyl ester and the balance substantially acetal groups,
   (b) 0.5 to 30 parts of an emulsifier,
   (c) 7 to 12.8 parts of water,
while heating the mixture at from 55° to 60° C., agitating and heating said mixture to form a water-in-resin dispersion, and then with continued agitation and maintenance of the temperature of the mixture at from 70° to 85° C., adding water to cause the water-in-resin dispersion to invert to a resin-in-water dispersion.

2. A process as in claim 1 wherein the polyvinyl acetal is polyvinyl butryal.

3. A process as in claim 1 wherein the solids content of the dispersion is in the range of 40–60%.

4. A process as in claim 1 wherein the emulsifier is the reaction product of a strong base and a soap forming organic acid.

References Cited by the Examiner
UNITED STATES PATENTS

| 2,143,228 | 1/1939 | Orthner et al. | 260—73 |
| 2,396,607 | 3/1946 | Rogers | 260—29.6 |
| 2,455,402 | 12/1948 | Bromley | 260—29.6 |
| 2,532,223 | 11/1950 | Bromley | 260—29.6 |
| 2,642,332 | 6/1953 | Cohen | 260—29.6 |

OTHER REFERENCES

Nielsen: Mechanical Properties of Polymers, Reinhold Publishing, 1962, page 19.

MURRAY TILLMAN, *Primary Examiner.*

DANIEL ARNOLD, LEON BERCOVITZ, *Examiners.*